(12) United States Patent
Hou et al.

(10) Patent No.: US 11,868,006 B2
(45) Date of Patent: Jan. 9, 2024

(54) LIQUID CRYSTAL DISPLAY DEVICE AND ELECTRONIC EQUIPMENT

(71) Applicant: WUHAN CHINA STAR OPTOELECTRONICS TECHNOLOGY CO., LTD., Wuhan (CN)

(72) Inventors: Shaojun Hou, Wuhan (CN); Quan Tang, Wuhan (CN); Wei Cheng, Wuhan (CN); Guanghui Liu, Wuhan (CN)

(73) Assignee: WUHAN CHINA STAR OPTOELECTRONICS TECHNOLOGY CO., LTD., Wuhan (CN)

( * ) Notice: Subject to any disclaimer, the term of this patent is extended or adjusted under 35 U.S.C. 154(b) by 556 days.

(21) Appl. No.: 17/051,746

(22) PCT Filed: Aug. 27, 2020

(86) PCT No.: PCT/CN2020/111904
§ 371 (c)(1),
(2) Date: Oct. 29, 2020

(87) PCT Pub. No.: WO2022/036740
PCT Pub. Date: Feb. 24, 2022

(65) Prior Publication Data
US 2023/0111777 A1    Apr. 13, 2023

(30) Foreign Application Priority Data
Aug. 19, 2020  (CN) .................. 202010837073.1

(51) Int. Cl.
G02F 1/13357    (2006.01)
G02F 1/1347     (2006.01)

(52) U.S. Cl.
CPC ...... *G02F 1/133606* (2013.01); *G02F 1/1347* (2013.01); *G02F 1/13476* (2013.01); *G02F 2203/48* (2013.01)

(58) Field of Classification Search
CPC ...................... G02F 1/13476; G02F 1/133606
See application file for complete search history.

(56) References Cited

U.S. PATENT DOCUMENTS

2019/0285936 A1    9/2019  Luo
2020/0244787 A1*   7/2020  Gu .................. G02F 1/1333

FOREIGN PATENT DOCUMENTS

CN    108885376 A       11/2018
CN    109541849 A  *    3/2019  ......... G02F 1/13306
(Continued)

OTHER PUBLICATIONS

International Search Report in International application No. PCT/CN2020/111904, dated May 20, 2021.
(Continued)

*Primary Examiner* — Alexander P Gross
(74) *Attorney, Agent, or Firm* — PV IP PC; Wei Te Chung; Zhigang Ma (57) ABSTRACT

A liquid crystal display device and an electronic equipment are provided. The liquid crystal display device includes a liquid crystal display panel and an adjustable diffusion sheet configured to improve a light transmissive rate of a light transmissive region. The adjustable diffusion sheet includes a first sub-section corresponding to the position of the light transmissive region. When the light transmissive region is in a transparent state, the first sub-section is in a transparent state. When the light transmissive region is in a display state, the first sub-section is in a fog state.

12 Claims, 5 Drawing Sheets

(56) References Cited

FOREIGN PATENT DOCUMENTS

| CN | 109541849 A | | 3/2019 | |
|---|---|---|---|---|
| CN | 110221496 A | | 9/2019 | |
| CN | 110231735 A | | 9/2019 | |
| CN | 110458131 A | * | 11/2019 | ......... G06K 9/00885 |
| CN | 110458131 A | | 11/2019 | |
| CN | 110471211 A | | 11/2019 | |
| CN | 111352268 A | | 6/2020 | |

OTHER PUBLICATIONS

Written Opinion of the International Search Authority in International application No. PCT/CN2020/111904, dated May 20, 2021.
Chinese Office Action issued in corresponding Chinese Patent Application No. 202010837073.1 dated Mar. 18, 2021, pp. 1-8.

* cited by examiner

LIQUID CRYSTAL DISPLAY DEVICE AND ELECTRONIC EQUIPMENT

This application is a Notional Phase of PCT Patent Application No. PCT/CN2020/111904 having international filing date of Aug. 27, 2020, which claims priority to Chinese Patent Application with the application No. 202010837073.1 filed on Aug. 19, 2020 with the National Intellectual Property Administration, the disclosure of which is incorporated by reference in the present application in its entirety.

FIELD OF INVENTION

The present disclosure relates to the field of display technology, and particularly relates to a liquid crystal display device and an electronic equipment.

BACKGROUND OF INVENTION

Under-screen optical sensor technology is disposing optical sensors below a screen directly, and by special panel design, allows a panel to not only be able to realize complete display of the full screen, but also ensure normal operation of the optical sensors therebelow.

Figure 1:
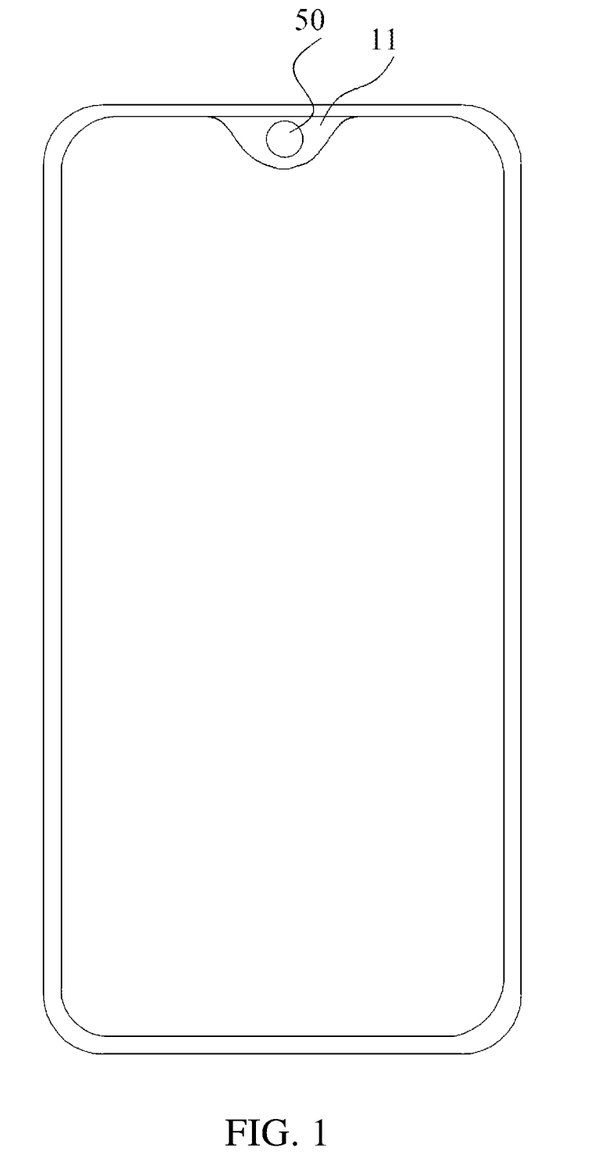
FIG. 1 is a top view of an electronic equipment in the prior art.

However, backlight plates of traditional liquid crystal display panels and liquid crystal display panels can cause barrier and scattering to external light, reducing a light transmittance rate of the optical sensors, making working requirements of the under-screen optical sensors mentioned above unable to be satisfied. As illustrated in FIG. 1, regarding an electronic equipment using a liquid crystal display panel, an optical sensor 50 is usually disposed in a non-display region 11. Therefore, an area of the non-display region is reduced, thereby reducing screen-to-body ratio.

SUMMARY OF INVENTION

One embodiment of the present disclosure provides a liquid crystal display device and an electronic equipment, which are able to effectively improve screen-to-body ratio.

One embodiment of the present disclosure provides a liquid crystal display device, including:

a liquid crystal display panel including a light transmissive region and a display region;

a backlight plate corresponding to a position of the display region, wherein a via hole is defined on the backlight plate, and a position of the via hole corresponds to a position of the light transmissive region;

an adjustable diffusion sheet configured to improve a light transmissive rate of the light transmissive region, wherein the adjustable diffusion sheet includes a first sub-section, and the first sub-section includes:

a first substrate including a first electrode, wherein the first electrode is disposed on a first side of the first substrate;

a second substrate disposed opposite to the first substrate, wherein the second substrate includes a second electrode, and the second electrode is disposed on a first side of the second substrate; and a first adjustable transparency material disposed between the first electrode and the second electrode, wherein when the light transmissive region is in a transparent state, the first sub-section is in a transparent state, when the light transmissive region is in a display state, the first sub-section is in a fog state; and a first light source configured to provide a light source to the light transmissive region when the light transmissive region is in the display state.

The present disclosure further provides an electronic equipment, including the liquid crystal display device mentioned above and an optical sensor. The optical sensor is disposed below the light transmissive region.

The liquid crystal display device of embodiments of the present disclosure includes a liquid crystal display panel, including a light transmissive region and a display region; a backlight plate corresponding to a position of the display region, wherein a via hole is defined on the backlight plate, and a position of the via hole corresponds to a position of the light transmissive region; a first substrate including a first electrode; a second substrate including a second electrode; a first adjustable transparency material disposed between the first electrode and the second electrode, a first light source configured to provide a light source to the light transmissive region when the light transmissive region is in the display state. Because the via hole is defined in the backlight plate and the adjustable diffusion sheet is added in the liquid crystal display device, barrier and scattering to external light incurred by the backlight plate and the display panel are prevented, that is, the light transmittance rate of the light transmissive region is improved. Therefore, the under-screen optical sensor can be used in the liquid crystal display panel, thereby improving the screen-to-body ratio.

DESCRIPTION OF DRAWINGS

To more clearly illustrate embodiments or the technical solutions of the present disclosure, the accompanying figures of the present disclosure required for illustrating embodiments or the technical solutions of the present disclosure will be described in brief. Obviously, the accompanying figures described below are only part of the embodiments of the present disclosure, from which figures those skilled in the art can derive further figures without making any inventive efforts.

DETAILED DESCRIPTION OF PREFERRED EMBODIMENTS

The technical solutions in the embodiments of the present disclosure are clearly and completely described in the following with reference to the accompanying drawings in the embodiments of the present disclosure. Obviously, the described embodiments are only part of the embodiments of the present disclosure, but are not all embodiments of the present disclosure. All other embodiments obtained by those skilled in the art based on the embodiments of the present disclosure without creative efforts are within the scope of the present disclosure.

In the description of the present disclosure, it is to be understood that the orientation or positional relationship indicated by the terms "center", "longitudinal", "transverse", "length", "width", "thickness", "upper", "lower", "front", "rear", "left", "right", "vertical", "horizontal", "top", "bottom", "inside", "outside", "clockwise", "counterclockwise" etc. is based on the orientation or positional relationship shown in the accompanying figures, which is merely for the convenience for describing of the present disclosure and for the simplification of the description, and is not intended to indicate or imply that the indicated devices or elements have a specific orientation or is constructed and operated in a specific orientation. Therefore, it should not be understood as a limitation on the present disclosure. Moreover, the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly. In the description of the present disclosure, the meaning of "a plurality" is two or more unless clearly and specifically defined otherwise.

In the present disclosure, unless expressly specified or limited otherwise, a first feature is "on" or "beneath" a second feature may include that the first feature directly contacts the second feature and may also include that the first feature does not directly contact the second feature. Furthermore, a first feature "on," "above," or "on top of" a second feature may include an embodiment in which the first feature is right "on," "above," or "on top of" the second feature and may also include that the first feature is not right "on," "above," or "on top of" the second feature, or just means that the first feature has a sea level elevation higher than the sea level elevation of the second feature. While first feature "beneath," "below," or "on bottom of" a second feature may include that the first feature is "beneath," "below," or "on bottom of" the second feature and may also include that the first feature is not right "beneath," "below," or "on bottom of" the second feature, or just means that the first feature has a sea level elevation lower than the sea level elevation of the second feature.

Figure 2:
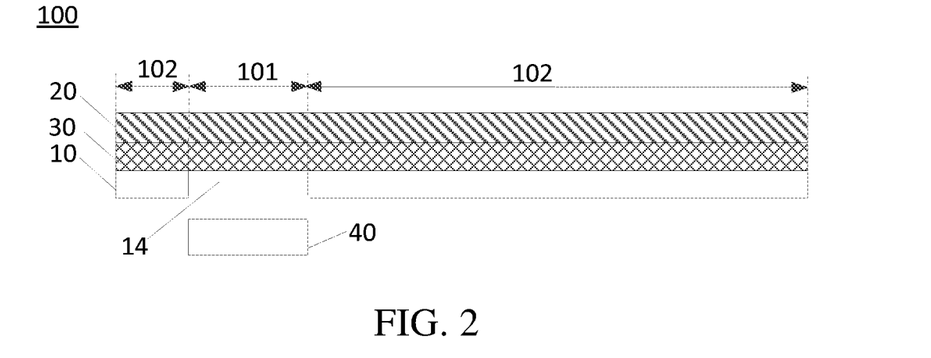
FIG. 2 is a structural schematic diagram of a liquid crystal display device provided by one embodiment of the present disclosure.
Figure 3:
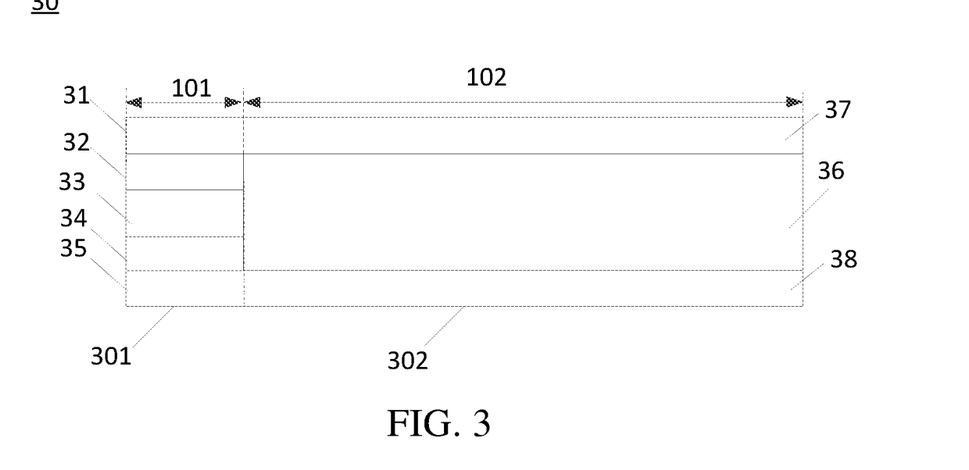
FIG. 3 is a structural schematic diagram of an adjustable diffusion sheet provided by one embodiment of the present disclosure.
Figure 4:
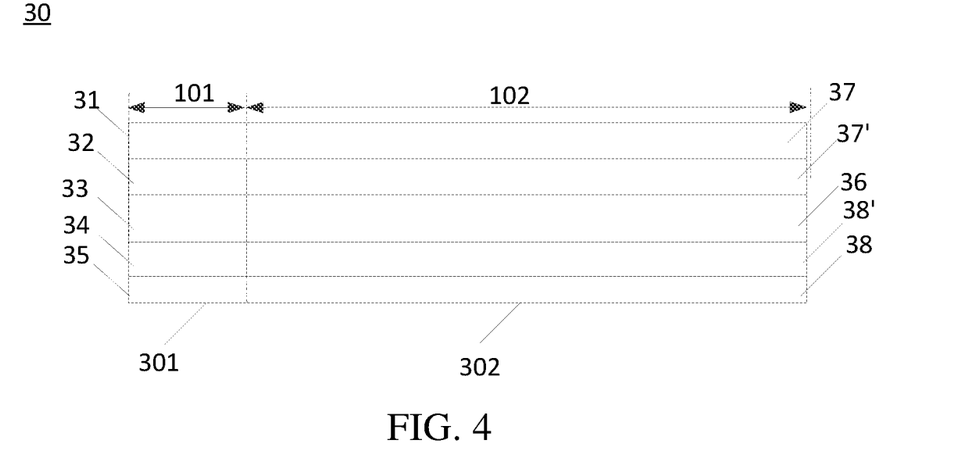
FIG. 4 is a structural schematic diagram of the adjustable diffusion sheet provided by another embodiment of the present disclosure.

Please refer to FIG. 2 to FIG. 4, FIG. 2 is a structural schematic diagram of a liquid crystal display device provided by one embodiment of the present disclosure.

As illustrated in FIG. 2, the liquid crystal display device 100 of this embodiment includes a backlight plate 10, a liquid crystal display panel 20, an adjustable diffusion sheet 30, and a first light source 40.

A via hole 14 is defined on the backlight plate 10. In one embodiment, the backlight plate 10 can include a reflective sheet, a light guide plate, and an optical module. Furthermore, the backlight plate 10 can further include a second light source (not shown in the figure). The second light source is configured to provide a light source to the backlight plate 10. The second light source can be a lateral light source or a transparent light source. When the second light source is the lateral light source, the second light source is disposed on a lateral surface of the backlight 10. When the second light source is the transparent light source, the second light source is disposed below the backlight plate 10.

The liquid crystal display panel 20 includes a light transmissive region 101 and a display region 102. The light transmissive region 101 is configured to dispose an optical sensor. The backlight plate 10 corresponds to a position of the display region 102, and a position of the via hole 14 corresponds to a position of the light transmissive region 101. In one embodiment, from bottom to top, the liquid crystal display panel 20 can include a first polarizer, an array substrate, a liquid crystal layer, a color film substrate, and a second polarizer.

The adjustable diffusion sheet 30 is disposed between the liquid crystal display panel 20 and the backlight plate 10. The adjustable diffusion sheet 30 corresponds to the positions of the light transmissive region 101 and the display region 102. Combining with FIG. 3, the adjustable diffusion sheet 30 includes a first sub-section 301 and a second sub-section 302 corresponding to the position of the light transmissive region 101. The first sub-section 301 includes a first substrate 31, a second substrate 35, and a first adjustable transparency material 33.

The first substrate 31 includes a first electrode 32. The first electrode 32 is disposed on a first side of the first substrate 31. The second substrate 35 includes a second electrode 34. The first electrode 32 is disposed on a first side of the second substrate 35. The second substrate 35 is disposed opposite to the first substrate 31. The first adjustable transparency material 33 is disposed between the first electrode 32 and the second electrode 34. The first sides are sides close to the first adjustable transparency material 33. In one embodiment, the first adjustable transparency material 33 can include at least one of polymer dispersed liquid crystals, polymer network liquid crystals, or cholesteric phase liquid crystals. When a voltage is applied, the cholesteric liquid crystals are made to be in a focal conic state. The focal conic state is same as a plane state, which has inherent twisting helix pitch. However, in a liquid crystal cell, liquid crystal molecules are in a polydomain state. In each domain, helix structures still exist, but orientations of helix axes of different domains are disorganized in space. The helix axes of different domains have different orientations, then focal conic structures are formed. The structures perform intensive light scattering incurred by discontinuous change of a refractive index on a domain boundary.

The second sub-section 302 corresponds to the position of the display region 102. The second sub-section 302 includes a third substrate 37, a fourth substrate 38, and a second adjustable transparency material 36. The fourth substrate 38 is disposed opposite to the third substrate 37. The second adjustable transparency material 36 is disposed between the third substrate 37 and the fourth substrate 38. Furthermore, in one embodiment, in order to simplify production process, the third substrate 37 is disposed on a same layer with the first substrate 31, the fourth substrate 38 is disposed on a same layer with the second substrate 35, that is, the second sub-section 302 does not include the first electrode and the second electrode. In one embodiment, in order to improve display effect of the backlight, a thickness of the second adjustable transparency material 36 is greater than a thickness of the first adjustable transparency material 33, and a material of the second adjustable transparency material 36 can be same as a material of the first adjustable transparency material 33.

In another embodiment, as illustrated in FIG. 4, the second sub-section 302 further includes a third electrode 37' and a fourth electrode 38'. The third electrode 37' is disposed on a first side of the third substrate 37. The fourth electrode 38' is disposed on a first side of the fourth substrate 38. The second adjustable transparency material 36 is disposed between the third electrode 37' and the fourth electrode 38'. In one embodiment, in order to further improve display effect of the backlight, the thickness of the second adjustable transparency material 36 is equal to the thickness of the first adjustable transparency material 33, and the second adjustable transparency material 36 can be same as the first adjustable transparency material 33.

When the light transmissive region 101 is in a transparent state, the first sub-section 301 is in the transparent state. When the light transmissive region 101 is in a display state, the first sub-section 301 is in a fog state.

The first light source 40 is configured to provide a light source to the light transmissive region when the light transmissive region 101 is in the display state. In one embodiment, the first light source 40 is the transparent light source, and the first light source 40 is disposed below the backlight plate 10. In another embodiment, the first light source 40 is the lateral light source. At this time, the first light source 40 is disposed on the lateral surface of the adjustable diffusion sheet 30. The transparent light source can be transparent light emitting diodes or micro light emitting diodes. Of course, the first light source is not limited thereto.

When the first electrode 32 and the second electrode 34 apply voltages, the first adjustable transparency material 33 is in a transparent state. When the first electrode 32 and the second electrode 34 do not apply voltages, the first adjustable transparency material 33 is in a fog state. A working principle of the second adjustable transparency material 36 is same as this. Materials of the first electrode 32 and the second electrode 34 can be transparent conductive materials, such as indium tin oxide.

Figure 5:
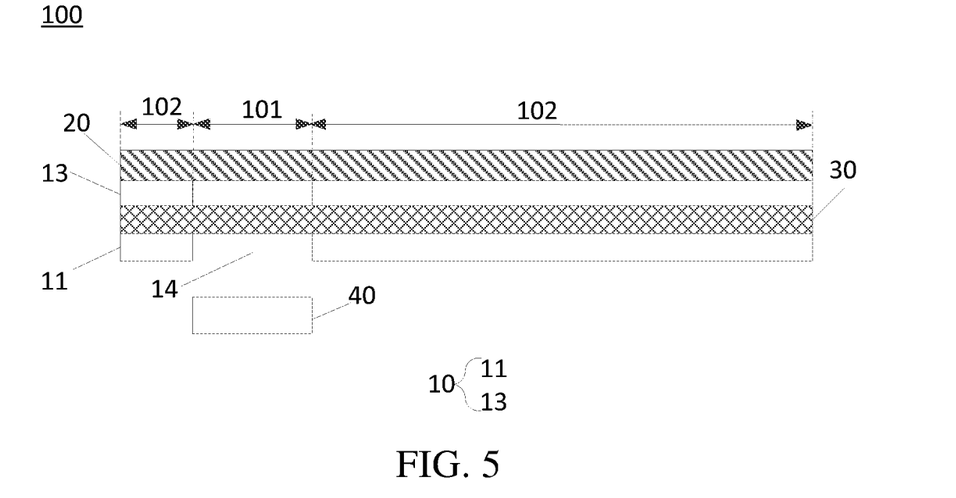
FIG. 5 is a structural schematic diagram of the liquid crystal display device provided by another embodiment of the present disclosure.

Please refer to FIG. 5, FIG. 5 is a structural schematic diagram of the liquid crystal display device provided by another embodiment of the present disclosure.

The difference between the liquid crystal display device of this embodiment and the first embodiment is that the adjustable diffusion sheet 30 of this embodiment is embedded in the backlight plate 10. For example, in one embodiment, the adjustable diffusion sheet 30 is located between the reflective sheet 11 and the optical module 13. At this time, the adjustable diffusion sheet 30 can replace the light guide plate in the backlight plate 10.

Figure 6:
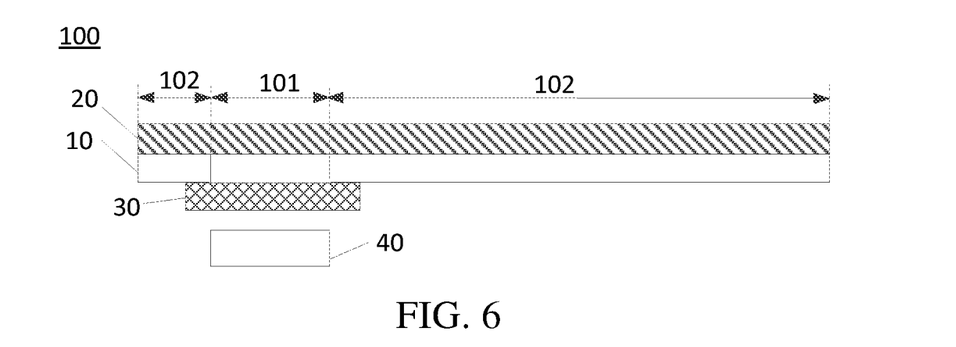
FIG. 6 is a structural schematic diagram of the liquid crystal display device provided by yet another embodiment of the present disclosure.

Please refer to FIG. 6, FIG. 6 is a structural schematic diagram of the liquid crystal display device provided by another embodiment of the present disclosure.

The difference between the liquid crystal display device of this embodiment and the first embodiment is that the adjustable diffusion sheet 30 of this embodiment is disposed below the backlight plate 10.

In this embodiment, when the first light source 40 is the transparent light source, the first light source 40 is disposed below the adjustable diffusion sheet 30.

An area of an orthogonal projection of the adjustable diffusion sheet 30 of this embodiment on the liquid crystal display panel can be greater than or equal to an area of an orthogonal projection of the light transmissive region 101 on the liquid crystal display panel.

Figure 7:
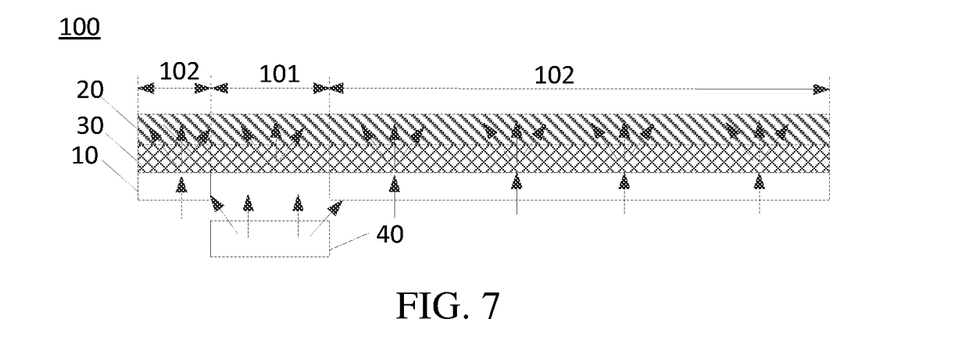
FIG. 7 is a structural schematic diagram of a light transmissive region in a display state provided by one embodiment of the present disclosure.
Figure 8:
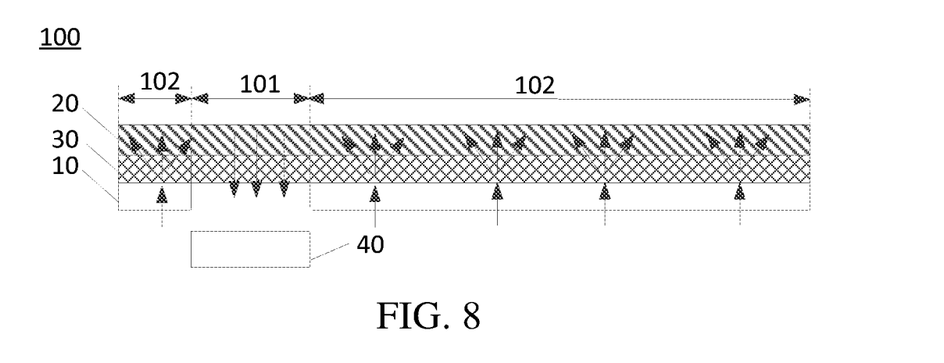
FIG. 8 is a structural schematic diagram of the light transmissive region in a transparent state provided by one embodiment of the present disclosure.

The working process of the liquid crystal display device will now be explained by taking the structure of the adjustable diffusion sheet disposed between the liquid crystal display panel and the backlight plate as an example, specifically, as illustrated in FIG. 7, when the optical sensor is not working, the light transmissive region 101 and the display region 102 are in the display state. At this time, the first electrode 32 and the second electrode 34 do not apply voltages, and the third electrode 37' and the fourth electrode 38' do not apply voltages also. The first adjustable transparency material 33 and the second adjustable transparency material 36 are in fog states so as to scatter light provided by the first light source and the second electrode. Combined with FIG. 8, when the optical sensor is working, the light transmissive region 101 is in a light transmissive state, the first electrode 32 and the second electrode 34 apply voltages, then the first adjustable transparency material 33 is in the transparent state so as to transmit external light to the optical sensor through the light transmissive region. At this time, the second adjustable transparency material 36 is in the fog state. Light propagation directions in FIG. 7 and FIG. 8 are illustrated as directions of the arrows. It can be understood that when the light transmissive region 101 is in the light transmissive state, the first light source 40 is in a turning off state. In other embodiment, when the first adjustable transparency material 33 is in the transparent state, light emitted from an external optical sensor can be transmitted out of the liquid crystal display panel.

Furthermore, regarding to embodiments of the adjustable diffusion sheet being embedded in the backlight plate or the adjustable diffusion sheet disposed below the backlight plate, the working processes of the liquid crystal display device are same as that in the above-mentioned embodiment, and redundant description will not be mentioned herein again.

Because the via hole is defined in the backlight plate and the adjustable diffusion sheet is added in the liquid crystal display device, barrier and scattering to external light incurred by the backlight plate and the display panel are prevented, that is, the light transmittance rate of the light transmissive region is improved. Therefore, the under-screen optical sensor can be used in the liquid crystal display panel, thereby improving the screen-to-body ratio. Furthermore, because the adjustable diffusion sheet is added, after the light in the light source is functioned by the adjustable diffusion sheet, light with higher uniformity of light intensity and viewing angles is obtained, thereby improving the display effect of the backlight.

Figure 9:
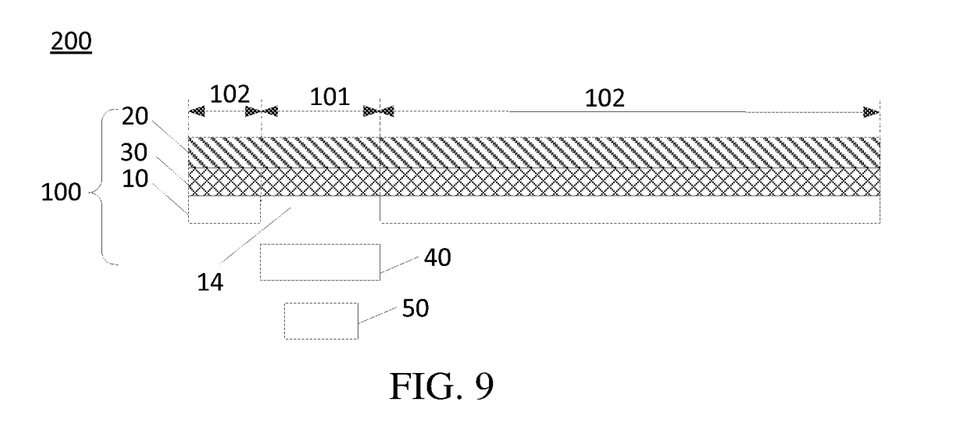
FIG. 9 is a structural schematic diagram of an electronic equipment provided by one embodiment of the present disclosure.
Figure 10:
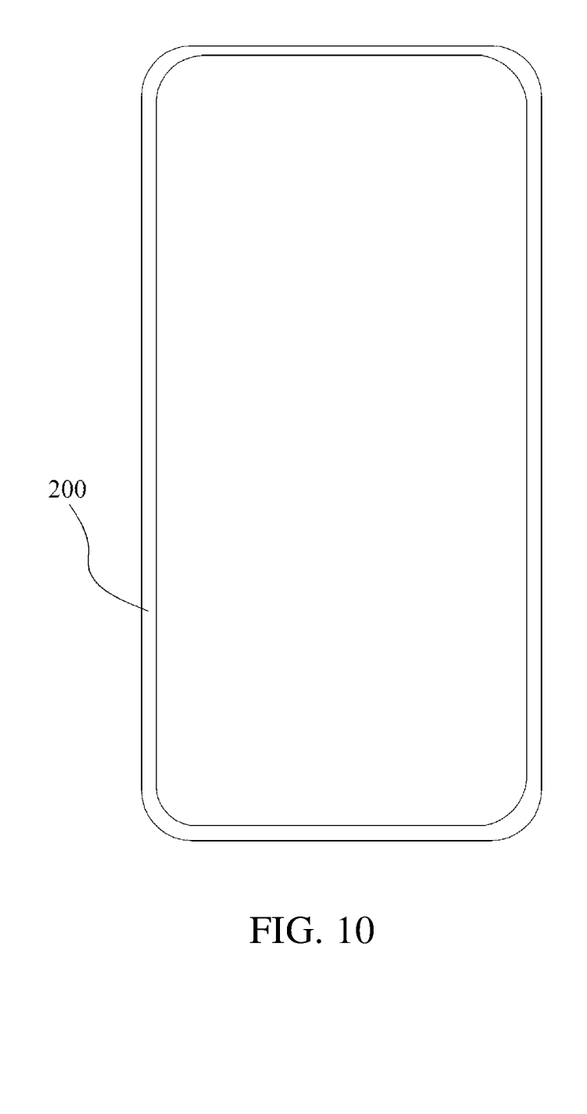
FIG. 10 is a top view of an electronic equipment provided by one embodiment of the present disclosure.

Please refer to FIG. 9 and FIG. 10, FIG. 9 is a structural schematic diagram of an electronic equipment provided by one embodiment of the present disclosure.

As illustrated in FIG. 9, the electronic equipment 200 can include the liquid crystal display device 100 and the optical sensor 50 mentioned above, and the optical sensor 50 is disposed below the light transmissive region. In one embodiment, the optical sensor 50 is disposed below the first light source 40. The optical sensor includes at least one of a camera, a fingerprint recognition module, or a distance sensor.

As illustrated in FIG. 10, in a top viewing angle, a non-display region does not exist in the electronic equipment 200 of this embodiment.

The electronic equipment includes but is not limited to mobile phones, tablet PCs, computer displays, game consoles, televisions, display screens, wearable devices, and other electrical appliances or home appliances, etc. with display capability.

It can be understood that FIG. 1 to FIG. 9 only provide a kind of example, which cannot limit the present disclosure.

The liquid crystal display device and the electronic equipment of embodiments of the present disclosure include a liquid crystal display panel, including the light transmissive region and the display region; the backlight plate corresponding to the position of the display region, wherein the via hole is defined on the backlight plate, and the position of the via hole corresponds to the position of the light transmissive region; the adjustable diffusion sheet configured to improve the light transmissive rate of the light transmissive region and including the first sub-section corresponding to the position of the light transmissive region; the first sub-section includes the first substrate including the first electrode, and the second substrate including the second electrode, wherein the second substrate is disposed opposite to the first substrate; the first adjustable transparency material is disposed between the first electrode and the second electrode, wherein when the light transmissive region is in a transparent state, the first sub-section is in a transparent state, and when the light transmissive region is in a display state, the first sub-section is in a fog state; and the first light source is configured to provide the light source to the light transmissive region when the light transmissive region is in the display state. Because the via hole is defined in the backlight plate and the adjustable diffusion sheet is added in the liquid crystal display device, barrier and scattering to external light incurred by the backlight plate and the display panel are prevented, that is, the light transmittance rate of the light transmissive region is improved. Therefore, the under-screen optical sensor can be used in the liquid crystal display panel, thereby improving the screen-to-body ratio.

Detailed description of the liquid crystal display device and the electronic equipment provided by embodiments of the present disclosure is described above. The principle and implementation manner of present disclosure are described herein with reference to specific embodiments. The foregoing descriptions of the embodiments are merely used for better understanding of the present disclosure. Meanwhile, for a person of ordinary skill in the art can make variations and modifications to the specific implementation manner and application scope according to the idea of this application. In summary, contents of the specification shall not be construed as a limitation to this application.

What is claimed is:

1. A liquid crystal display device, comprising:
   a liquid crystal display panel comprising a light transmissive region and a display region;
   a backlight plate corresponding to a position of the display region, wherein a via hole is defined on the backlight plate, and a position of the via hole corresponds to a position of the light transmissive region;
   an adjustable diffusion sheet configured to improve a light transmissive rate of the light transmissive region, wherein the adjustable diffusion sheet includes a first sub-section, and the first sub-section comprises:
   a first substrate comprising a first electrode, wherein the first electrode is disposed on a first side of the first substrate;
   a second substrate disposed opposite to the first substrate, wherein the second substrate comprises a second electrode, and the second electrode is disposed on a first side of the second substrate; and
   a first adjustable transparency material disposed between the first electrode and the second electrode,
   wherein when the light transmissive region is in a transparent state, the first sub-section is in the transparent state, and when the light transmissive region is in a display state, the first sub-section is in a fog state; and
   a first light source configured to provide a light source to the light transmissive region when the light transmissive region is in the display state;
   wherein the adjustable diffusion sheet comprises a second sub-section, the second sub-section corresponds to the position of the display region, and the second sub-section comprises:
   a third substrate;
   a fourth substrate disposed opposite to the third substrate; and
   a second adjustable transparency material disposed between the third substrate and the fourth substrate, wherein a thickness of the second adjustable transparency material is greater than a thickness of the first adjustable transparency material.

2. The liquid crystal display device as claimed in claim 1, wherein the second adjustable transparency material comprises at least one of polymer dispersed liquid crystals, polymer network liquid crystals, or cholesteric liquid crystals.

3. The liquid crystal display device as claimed in claim 1, wherein the first adjustable transparency material comprises at least one of polymer dispersed liquid crystals, polymer network liquid crystals, or cholesteric phase liquid crystals.

4. The liquid crystal display device as claimed in claim 1, wherein the adjustable diffusion sheet is disposed below the backlight plate.

5. The liquid crystal display device as claimed in claim 1, wherein the adjustable diffusion sheet is embedded in the backlight plate or is located between the backlight plate and the liquid crystal display panel.

6. The liquid crystal display device as claimed in claim 1, wherein the first light source is a transparent light source, and the transparent light source is disposed below the backlight plate or is disposed below the adjustable diffusion sheet.

7. An electronic equipment, comprising a liquid crystal display device and an optical sensor, wherein the optical sensor is disposed below a light transmissive region, and the liquid crystal display device comprises:
   a liquid crystal display panel comprising the light transmissive region and a display region;
   a backlight plate corresponding to a position of the display region, wherein a via hole is defined on the backlight plate, and a position of the via hole corresponds to a position of the light transmissive region;
   an adjustable diffusion sheet configured to improve a light transmissive rate of the light transmissive region, wherein the adjustable diffusion sheet comprises a first sub-section, and the first sub-section comprises:
   a first substrate comprising a first electrode, wherein the first electrode is disposed on a first side of the first substrate;
   a second substrate disposed opposite to the first substrate, wherein the second substrate comprises a second electrode, and the second electrode is disposed on a first side of the second substrate; and
   a first adjustable transparency material disposed between the first electrode and the second electrode,
   wherein when the light transmissive region is in a transparent state, the first sub-section is in the transparent state, and when the light transmissive region is in a display state, the first sub-section is in a fog state; and a first light source configured to provide a light source to the light transmissive region when the light transmissive region is in the display state;

wherein the adjustable diffusion sheet comprises a second sub-section, the second sub-section corresponds to the position of the display region, and the second sub-section comprises:

a third substrate;

a fourth substrate disposed opposite to the third substrate; and a second adjustable transparency material disposed between the third substrate and the fourth substrate, wherein a thickness of the second adjustable transparency material is greater than a thickness of the first adjustable transparency material.

8. The electronic equipment as claimed in claim 7, wherein the second adjustable transparency material comprises at least one of polymer dispersed liquid crystals, polymer network liquid crystals, or cholesteric liquid crystals.

9. The electronic equipment as claimed in claim 7, wherein the first adjustable transparency material comprises at least one of polymer dispersed liquid crystals, polymer network liquid crystals, or cholesteric phase liquid crystals.

10. The electronic equipment as claimed in claim 7, wherein the adjustable diffusion sheet is disposed below the backlight plate.

11. The electronic equipment as claimed in claim 7, wherein the adjustable diffusion sheet is embedded in the backlight plate or is located between the backlight plate and the liquid crystal display panel.

12. The electronic equipment as claimed in claim 7, wherein the first light source is a transparent light source, and the transparent light source is disposed below the backlight plate or is disposed below the adjustable diffusion sheet.

* * * * *